United States Patent
Kiddle

(10) Patent No.: US 7,090,208 B1
(45) Date of Patent: Aug. 15, 2006

(54) RUBBER BUSHING

(75) Inventor: Robert Michael Kiddle, Skipton (GB)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 11/043,728

(22) Filed: Jan. 26, 2005

(51) Int. Cl.
*B60G 11/22* (2006.01)

(52) U.S. Cl. ............... 267/293; 267/294; 267/141.1; 267/140.12; 267/276; 267/269

(58) Field of Classification Search ............... 267/293, 267/294, 141.1, 141.2, 140.12, 260, 269, 267/270, 30, 229, 276; 248/608; 280/124.177, 280/124.111; 384/215, 202, 220, 222; 403/221, 403/228, 243, 351, 352, 365–369, 390, 224
See application file for complete search history.

(56) References Cited

U.S. PATENT DOCUMENTS

| | | | | |
|---|---|---|---|---|
| 1,624,239 A | * | 4/1927 | Harris | ................ 267/269 |
| 1,780,724 A | * | 11/1930 | Short | ................ 248/635 |
| 2,367,817 A | * | 1/1945 | Brown | ................ 180/352 |
| 2,533,186 A | | 12/1950 | Bricker | |
| 2,771,312 A | | 11/1956 | Thiry | |
| 2,787,486 A | | 4/1957 | Thiry | |
| 2,820,088 A | | 1/1958 | Sperry | |
| 3,123,901 A | | 3/1964 | Traugott | |
| 3,199,186 A | | 8/1965 | Simpson | |
| 3,243,240 A | | 3/1966 | Arthur | |
| 4,007,924 A | * | 2/1977 | Jorn et al. | ................ 267/282 |
| 4,235,482 A | | 11/1980 | Gibson | |
| 5,031,545 A | * | 7/1991 | Bourgeot | ................ 105/199.1 |
| 5,080,332 A | | 1/1992 | Yoda | |
| 5,178,375 A | | 1/1993 | Hamaekers | |
| 5,190,269 A | | 3/1993 | Ikeda | |
| 5,275,429 A | * | 1/1994 | Bunker | ................ 280/124.177 |
| 5,472,226 A | * | 12/1995 | Bunker | ................ 280/681 |
| 6,585,223 B1 | * | 7/2003 | VanDenberg | ................ 248/635 |

* cited by examiner

*Primary Examiner*—James McClellan
*Assistant Examiner*—Mariano Sy
(74) *Attorney, Agent, or Firm*—Carlson, Gaskey & Olds

(57) ABSTRACT

A bushing assembly for a vehicle suspension system includes first and second bushing components that are fixed to a central pin. The pin is supported on a suspension component and includes pin ends that are mounted to an axle housing component. A washer is supported on the pin between the first and second bushings and abuts against inboard edges of the first and second bushings. An outer retaining tube surrounds the first and second bushings and the washer. The outer retaining tube includes opposing deformed end portions that directly engage outboard edges of the first and second bushings to form axial load carrying surfaces for the first and said second bushings.

13 Claims, 2 Drawing Sheets

RUBBER BUSHING

TECHNICAL FIELD

The subject invention relates to a bushing assembly for a vehicle suspension system that includes a pair of bushing members separated by a washer and an outer retaining sleeve that surrounds the pair of bushing members and provides axial load carrying surfaces for the bushing assembly.

BACKGROUND OF THE INVENTION

Vehicle suspension systems include bushing assemblies that are mounted between a suspension beam component and an axle housing. Typically, each bushing assembly includes an inner sleeve, an outer sleeve, and a piece of urethane or rubber that is positioned between the inner and outer sleeves. The inner sleeve is supported on a pin with the outer sleeve surrounding an outer circumferential surface of the rubber sleeve.

In order to accommodate axial loading, the bushing assembly has traditionally required a large single piece of rubber or urethane between the inner and outer sleeves. This traditional configuration is expensive and often does not provide sufficient conical compliance during vehicle operation. Further, this configuration has a tendency to experience high pre-loads, which is undesirable.

Thus, there is a need for a low-cost bushing assembly that reduces pre-loads, and which provides sufficient axial loading while optimizing conical compliance, in addition to overcoming the other deficiencies in the prior art.

SUMMARY OF THE INVENTION

A bushing assembly includes a first bushing member and a second bushing member that are separated by a washer. An outer retaining sleeve surrounds the first and second bushing members and the washer. The outer retaining sleeve includes opposing end portions that are deformed over outboard edges of the first and second bushing members to form axial load carrying surfaces for the first and said second bushings.

In one example, the bushing assembly is supported on a vehicle suspension component, such as a suspension arm. The bushing assembly includes a pin having a central body extending between pin ends. The pin ends are adapted to be mounted to an axle component, such as an axle housing.

Each of the first and second bushings includes an inner sleeve fixed to the pin and a resilient sleeve surrounding an outer circumferential surface of the inner sleeve. The washer is in direct abutting engagement with inboard edges of the inner sleeve and the resilient sleeves of both the first and second bushings. The outer retaining sleeve engages outer circumferential surfaces of the resilient sleeves. The end portions of the outer retaining sleeve are deformed over outboard edges of the resilient sleeve.

Preferably, the first and second bushings are fixed to the central body in an interference fit. The washer is supported on the pin intermediate the first and second bushings. The washer is rigidly held in place by the first and second bushings at a generally central position on the pin. The central position of the washer provides optimal conical compliance, which is controlled by the extent of roll-over of the opposing end portions of the outer retaining sleeve.

These and other features of the present invention can be best understood from the following specification and drawings, the following of which is a brief description.

DETAILED DESCRIPTION OF THE PREFERRED EMBODIMENT

Figure 1:
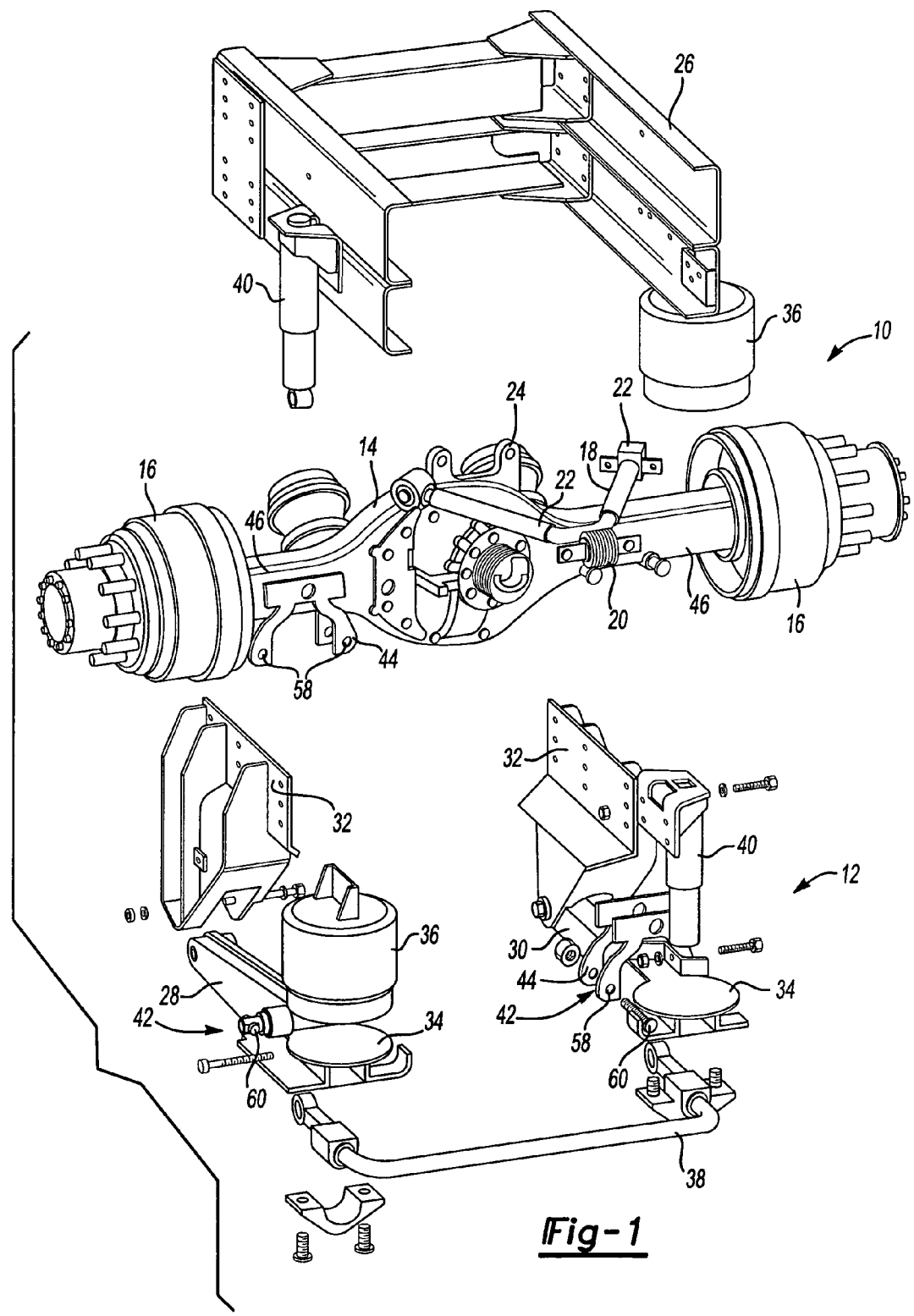
FIG. 1 is an exploded view of one example of a vehicle suspension system incorporating the subject invention.

An axle assembly 10 with a suspension system 12 is shown in FIG. 1. The axle assembly 10 includes an axle housing 14 that extends between a pair of wheel ends 16. The suspension system 12 includes a V-rod 18 with a center pivot 20 and a pair of legs 22 that extend outwardly from the center pivot 20. The center pivot 20 is mounted at a center portion 24 of the axle housing 14 and each leg of the pair of legs 22 is mounted to a vehicle frame 26 as known.

The suspension system 12 also includes first 28 and second 30 trailing arms that are mounted to suspension hanger brackets 32 at one end, and which include spring seats 34 for supporting air springs 36. A stabilizer bar assembly 38 extends laterally between the first 28 and second 30 trailing arms. The suspension hanger brackets 32 are mounted to the vehicle frame 26. Shock absorbers 40 are also mounted between the vehicle frame 26 and the first 28 and second 30 trailing arms.

A bushing assembly 42 is supported on each of the first 28 and second 30 trailing arms. The bushing assemblies 42 are mounted to brackets 44 fixed to housing legs 46 of the axle housing 14.

Figure 2:
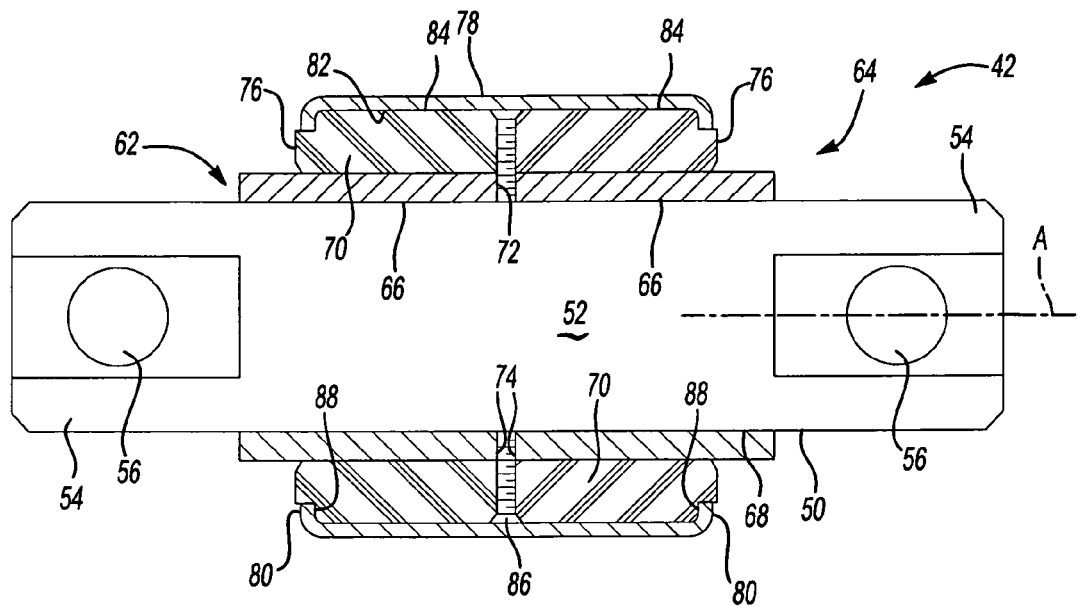
FIG. 2 is a cross-sectional view of a bushing assembly as used in the vehicle suspension system of FIG. 1.
Figure 3:
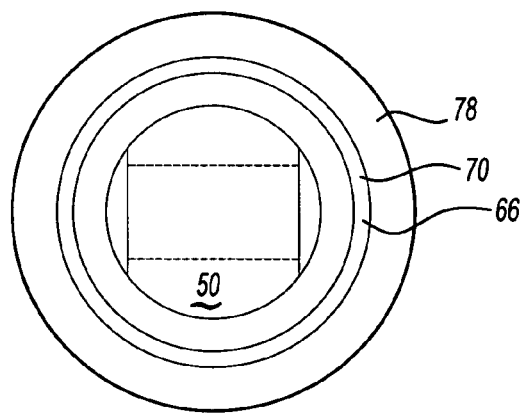
FIG. 3 is an end view of the bushing assembly of FIG. 2.

An example of the bushing assembly 42 is shown in FIGS. 2 and 3. The bushing assembly 42 includes a pin 50 with a center body portion 52 that extends between pin ends 54 defining a pin axis A. The central body portion 52 is preferably a solid steel component, however, other similar materials could also be used. Each pin end 54 includes an opening 56 that corresponds to an opening 58 (FIG. 1) in the brackets 44 mounted to the axle housing 14. Fasteners 60 (FIG. 1) extend through the openings 56, 58 in the pin ends 54 and brackets 44 to secure the bushing assemblies 42 to the axle housing 14.

The bushing assembly 42 includes a first bushing member 62 and a second bushing member 64. Each of the first 62 and second 64 bushing members includes an inner sleeve 66 that is press fit onto an outer circumferential surface 68 of the center body portion 52 of the pin 50 to achieve an interference fit. The inner sleeves 66 are preferably formed from steel, however, other similar materials could also be used. Each of the first 62 and second 64 bushing members also includes a resilient sleeve 70 that surrounds an outer circumferential surface of each inner sleeve 66. The resilient sleeves 70 are preferably formed from rubber, however, other similar materials could also be used.

A washer 72 is positioned between the first 62 and second 64 bushing members. Each of the first 62 and second 64 bushing members include an inboard edge 74 and an outboard edge 76. The inboard edges 74 face each other and the outboard edges 76 face away from each other. The washer 72 is preferably a single piece washer that directly abuts against the inboard edges 74 of the first 62 and second 64 bushing members. The washer 72 serves as a restraining component that provides additional lateral resistance in a direction parallel to the pin axis A. The washer 72 is supported on the pin 50 and is rigidly held in place by the first 62 and second 64 bushing members. The washer 72 is preferably made from steel, however, other similar materials could also be used.

An outer retaining tube or sleeve 78 substantially surrounds the first 62 and second 64 bushing members and the washer 72. The outer retaining sleeve 78 includes opposing sleeve end portions 80 that are deformed over the outboard edges 76 of the first 62 and second 64 bushing members. Preferably, the opposing sleeve end portions 80 are deformed over outboard edges of the resilient sleeves 70, with outboard edges of the inner sleeves 66 extending axially outwardly from the resilient sleeves 70 in opposing directions along the pin axis A. Preferably, the outer retaining sleeve 78 is formed from a steel material and the opposing sleeve end portions 80 are crimped over the outboard edges 76, however, other similar materials and deforming methods could also be used.

The outer retaining sleeve 78 is a single piece component that has an inner surface 82 that directly engages outer circumferential surfaces 84 of each of the resilient sleeves 70 of the first 62 and second 64 bushing members. The inner surface 82 is defined by radial distance from pin axis A that is greater than the diameter of the washer 72 at an outer circumferential edge. This forms an annular space 86 between the inner surface 82 of the outer retaining sleeve 78 and the washer 72. Further, the annular space 86 is between the first 62 and second 64 bushing members.

While the bushing assembly is shown as being installed in a suspension system configured as shown in FIG. 1, it should be understood that the bushing assembly could be used in other suspension applications. Thus, the suspension system of FIG. 1 is merely one example of a suspension system that benefits from the invention.

The washer 72 is preferably centrally positioned on the pin 50. In one example, the washer 72 is positioned generally equal distances from each of the pin ends 54 and/or opposing sleeve end portions 80. As discussed above, the opposing sleeve end portions 80 are deformed or rolled over the outboard edges 76 of the first 62 and second 64 bushing members. The opposing sleeve end portions 80 are crimped to form transversely extending lips that define axial load carrying surfaces 88 for the first 62 and second 64 bushing members. The axial load carrying surfaces 88 provide lateral resistance in addition to the lateral resistance provided by the washer 72. The central location of the washer 72 is critical as the configuration provides optimal conical compliance, which can be controlled by the extent of roll-over of the opposing sleeve end portions 80. Further, this unique configuration also reduces pre-loads on the bushing assembly 42.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A bushing assembly comprising:
a first cylindrical bushing including a first inner cylindrical sleeve and a first resilient cylindrical sleeve surrounding an outer circumference of said first inner cylindrical sleeve;
a second cylindrical bushing axially spaced from said first cylindrical bushing and including a second inner cylindrical sleeve and a second resilient cylindrical sleeve surrounding an outer circumference of said second inner cylindrical sleeve;
a washer positioned intermediate said first and said second cylindrical bushings and wherein said first and said second cylindrical bushings each include inboard edges facing each other and outboard edges facing away from each other with said washer being in direct engagement with said inboard edges; and
an outer retaining tube substantially surrounding said first cylindrical bushing, said second cylindrical bushing, and said washer wherein an inner surface of said outer retaining tube is radially spaced from an outer circumferential edge of said washer to define an annular space and wherein said outer retaining tube directly engages an outer circumferential surface of said first and said second resilient cylindrical sleeves, and wherein said outer retaining tube includes opposing end portions engaging said outboard edges of said first and second cylindrical bushings where said opposing end portions are crimped to form transversely extending lips that define axial load carrying surfaces.

2. The bushing assembly according to claim 1 wherein each of said first and said second inner cylindrical sleeves has an inner surface that engages a pin and an outer surface that engages a respective one of said first and said second resilient cylindrical sleeves, said outer surface being defined by a generally constant diameter extending along a length of said first and said second inner cylindrical sleeves.

3. The bushing assembly according to claim 1 including a pin having a central body portion, and first and second pin ends each including structure for attachment to a suspension component, wherein said first and said second cylindrical bushings are mounted on said central body portion with said first and second pin ends extending outwardly of opposing ends of said outer retaining tube.

4. The bushing assembly according to claim 1 wherein each of said first and said second inner cylindrical sleeves is comprised of a single inner cylindrical sleeve and wherein each of said first and said second resilient cylindrical sleeves is comprised of a single intermediate resilient cylindrical sleeve positioned directly between said single inner cylindrical sleeve and said outer retaining tube.

5. A bushing assembly comprising:
a pin having a central body extending between pin ends and defining a pin axis;
a bracket having structure for attachment to an axle housing, and wherein said pin ends comprise a first pin end supported by said bracket and a second pin end supported by said bracket;
a first bushing having a first inner sleeve fixed to said central body and a first resilient sleeve fixed to an outer circumference of said first inner sleeve;
a second bushing having a second inner sleeve fixed to said central body and a second resilient sleeve fixed to an outer circumference of said second inner sleeve, said second bushing being axially spaced from said first bushing along said pin axis;
a washer supported by said pin and positioned between said first and said second bushings along said pin axis; and
an outer sleeve having first and second transversely extending end portions that directly engage opposing outboard edges of said first and said second resilient sleeves, respectively, said first and second transversely extending end portions forming axial load carrying surfaces for said first and said second bushings.

6. The bushing assembly according to claim 5 wherein said pin ends are adapted to mount the bushing assembly between an axle housing and a suspension component.

7. The bushing assembly according to claim 5 wherein said first and said second resilient sleeves have a generally constant outer diameter that is greater than a diameter of said washer.

8. The bushing assembly according to claim 5 wherein an inner surface of said outer sleeve is radially spaced from an outer circumferential edge of said washer to define an annular space.

9. The bushing assembly according to claim 5 wherein said outer sleeve, said washer, and said first and said second inner sleeves are formed from a steel material.

10. The bushing assembly according to claim 5 wherein said first and said second inner sleeves each comprise rigid cylindrical tubes, and wherein said first and said second resilient sleeves each comprise resilient cylindrical tubes.

11. A suspension assembly comprising:

at least one suspension arm; and a bushing assembly supported by said at least one suspension arm, said bushing assembly including a pin having a pair of pin ends adapted for mounting to an axle housing, a bracket to be fixed to a housing leg of the axle housing wherein said pair of pin ends comprises a first pin end supported by said bracket and a second pin end supported by said bracket, a first bushing fixed to said pin, a second bushing fixed to said pin and laterally spaced from said first bushing, a washer supported by said pin and positioned intermediate said first and said second bushings, and an outer sleeve engaging an outer circumferential surface of said first and said second bushings.

12. The suspension assembly according to claim 11 wherein said first and said second bushings each include an inboard edge and an outboard edge with said washer being in direct engagement with said inboard edges of said first and said second bushings and wherein said outer sleeve includes opposing deformed end portions directly engaging said outboard edges of said first and second bushings to form axial load carrying surfaces for said first and said second bushings.

13. The suspension assembly according to claim 11 wherein said first and said second bushings each include an inner cylindrical sleeve mounted to said pin, and an intermediate cylindrical sleeve comprised of a resilient material surrounding said inner cylindrical sleeve with said outer sleeve surrounding said intermediate cylindrical sleeve.

\* \* \* \* \*